US011356811B2

(12) United States Patent
Ottnad et al.

(10) Patent No.: US 11,356,811 B2
(45) Date of Patent: Jun. 7, 2022

(54) INDOOR LOCATION SYSTEMS FOR INDUSTRIAL PRODUCTION

(71) Applicant: TRUMPF Werkzeugmaschinen GmbH + Co. KG, Ditzingen (DE)

(72) Inventors: Jens Ottnad, Karlsruhe (DE); Korbinian Weiss, Korntal (DE); Benjamin Schwarz, Muenchingen (DE); Ulrich Schneider, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 19 days.

(21) Appl. No.: 17/078,186

(22) Filed: Oct. 23, 2020

(65) Prior Publication Data
US 2021/0044935 A1 Feb. 11, 2021

Related U.S. Application Data

(63) Continuation of application No. PCT/EP2019/059873, filed on Apr. 17, 2019.

(30) Foreign Application Priority Data

Apr. 26, 2018 (DE) .......................... 102018110145.7

(51) Int. Cl.
*H04W 4/029* (2018.01)
*H04W 4/33* (2018.01)
*G05B 19/418* (2006.01)

(52) U.S. Cl.
CPC ...... *H04W 4/029* (2018.02); *G05B 19/41835* (2013.01); *H04W 4/33* (2018.02); *G05B 2219/31025* (2013.01)

(58) Field of Classification Search
CPC .. H04W 4/029; H04W 4/33; G05B 19/41835; G05B 2219/31025; Y02P 90/30; G06Q 50/04
See application file for complete search history.

(56) References Cited

U.S. PATENT DOCUMENTS

2003/0150908 A1 8/2003 Pokorny et al.
2006/0092033 A1 5/2006 Hoff et al.
(Continued)

FOREIGN PATENT DOCUMENTS

DE 4306209 A1 9/1994
DE 10248142 B3 7/2004
(Continued)

OTHER PUBLICATIONS

DE Office Action in German Appln. No. 10 2018 110 145, dated Jan. 25, 2019, 6 pages (English translation).
(Continued)

*Primary Examiner* — Kabir A Timory
(74) *Attorney, Agent, or Firm* — Fish & Richardson P.C.

(57) ABSTRACT

Methods, devices, and systems for production controls of process sequences in industrial processing of workpieces supported by indoor localization are provided. In one aspect, an indoor location system includes a plurality of mobile transceivers and an analyzer. At least one mobile transceiver is configured to determine a position of a selected mobile transceiver in a three-dimensional space. Each mobile transceiver is spatially assignable to a corresponding object from a group of objects within a framework of process sequences. Each object is movable in one or more dimensions in the three-dimensional space. The analyzer is configured to determine the position of the selected mobile transceiver based at least on run times of electromagnetic signals between the mobile transceivers in a position determination process and to perform tracking of a movement of a target object assigned to the selected mobile transceiver based on the position of the selected mobile transceiver.

20 Claims, 3 Drawing Sheets

(56) References Cited

U.S. PATENT DOCUMENTS

| | | |
|---|---|---|
| 2007/0293952 A1 | 12/2007 | Callaghan et al. |
| 2011/0045763 A1 | 2/2011 | Mohanty et al. |
| 2013/0233922 A1 | 9/2013 | Schoening et al. |
| 2014/0095119 A1 | 4/2014 | Lee et al. |
| 2014/0240125 A1 | 8/2014 | Burch et al. |
| 2015/0119077 A1 | 4/2015 | Bucheim et al. |
| 2015/0356332 A1 | 6/2015 | Turner et al. |
| 2015/0253766 A1 | 9/2015 | Pettersson et al. |
| 2016/0100289 A1 | 4/2016 | Mayorchik et al. |
| 2016/0363663 A1 | 12/2016 | Mindell et al. |
| 2017/0017223 A1 | 1/2017 | Skaggs et al. |
| 2017/0039516 A1* | 2/2017 | Amann ............ H04B 17/318 |
| 2017/0039517 A1 | 2/2017 | Amann et al. |
| 2017/0064667 A1 | 3/2017 | Mycek et al. |
| 2017/0075346 A1 | 3/2017 | Oya et al. |
| 2018/0052452 A1 | 2/2018 | Kimura et al. |
| 2018/0099643 A1 | 4/2018 | Golsch et al. |
| 2018/0239010 A1 | 8/2018 | Mindell et al. |
| 2018/0246497 A1 | 8/2018 | Wolf et al. |
| 2019/0049929 A1 | 2/2019 | Good et al. |
| 2019/0240703 A1 | 8/2019 | Kiefer et al. |
| 2019/0243343 A1 | 8/2019 | Kiefer et al. |
| 2020/0208989 A1 | 7/2020 | Ottnad et al. |
| 2020/0218235 A1 | 7/2020 | Kiefer et al. |
| 2020/0218237 A1 | 7/2020 | Ottnad et al. |

FOREIGN PATENT DOCUMENTS

| | | |
|---|---|---|
| DE | 102005037567 | 5/2006 |
| DE | 102010041548 A1 | 9/2010 |
| DE | 102011054360 A1 | 4/2013 |
| DE | 202016106352 U1 | 12/2016 |
| DE | 102016120131 A1 | 4/2018 |
| DE | 102016120132 A1 | 4/2018 |
| DE | 102016220015 A1 | 4/2018 |
| DE | 102017107357 A1 | 4/2018 |
| DE | 102017120382 B3 | 10/2018 |
| DE | 102017120378 A1 | 3/2019 |
| DE | 102017120381 A1 | 3/2019 |
| DE | 102017120383 A1 | 3/2019 |
| EP | 2138920 A2 | 12/2009 |
| EP | 2963953 A1 | 1/2016 |
| EP | 3118702 A1 | 1/2017 |
| GB | 2513956 A | 11/2014 |
| JP | 2002-108431 | 4/2002 |
| JP | 2005-190120 | 7/2005 |
| JP | 2007-095006 | 4/2007 |
| JP | 2012-218037 | 11/2012 |
| WO | WO2011/033504 A1 | 3/2011 |
| WO | WO 2012/167301 A1 | 5/2012 |
| WO | WO 2013/053569 A1 | 4/2013 |
| WO | WO 2018/069314 A1 | 4/2018 |
| WO | WO 2019/048152 A1 | 3/2019 |
| WO | WO 2019/048153 A1 | 3/2019 |

OTHER PUBLICATIONS

PCT International Search Report, in International Appln. No. PCT/EP2019/059873, dated Jun. 25, 2019, 19 pages (with English translation).

U.S. Non-Final Office Action in U.S. Appl. No. 16/809,650, dated Mar. 31, 2022, 28 pages.

DE Office Action in German Appln. No. 102017120381.8 datad Jul. 5, 2018, 6 pages.

DE Office Action in German Appln. No. 102017120382.6, dated May 2, 2018, 3 pages.

DE Office Action in German Appln. No. 102018110150.3. dated Jan. 24, 2019, 4 pages.

JP Japanese Office Action in Japanese Appln. No. 2020-512608, dated Nov. 29, 2021, 10 pages (with English translation).

Kritz et al., "Improving Indoor Localization Using Bluetooth Low Energy Beacons," Mobile Information Systems, 2016, 11 pages.

Omni-ID, "Omni-ID ® View 3 & View 4," 2016, 2 pages.

Omni-ID, "Omni-ID ® Power 60," 2016, 2 pages.

PCT International Preliminary Report on Patentability in International Appln. No. PCT/EP2018/072863, dated Mar. 10, 2020, 16 pages (with English translation).

PCT International Search Report and Written Opinion in International Appln. No. PCT/EP2018/071163, dated Nov. 12, 2018, 24 pages (with English translation).

PCT International Search Report and Written Opinion in International Appln. No. PCT/EP2018/071164, dated Nov. 12, 2018, 25 pages (with English translation).

PCT International Search Report and Written Opinion in International Appln. No. PCT/EP2018/072863, dated Jan. 2, 2019, 21 pages (with English translation).

Ramakrishnan et al., "Feasibility and Efficacy of BLE Beacon IoT Devixes in Inventory Management at the Shop Floor," International Journal of Electrical & Computer Engineering, Oct. 2016, 6(5):2362-2368.

Swedberg, "Omni-ID's View 10 Tag Aims to Replace Paperwork at Detroit Diesel, Other Factories," RFID Journal 2014, 3 pages.

U.S. Non-Final Office Action in U.S. Appl. No. 16/809,627, dated Jan. 3, 2022, 16 pages.

Zhong et al., "A two-level advanced production planning and scheduling model for RFID-enabled ubiquitous manufacturing." Advanced Engineering Informatics. Oct. 2015, 29(4):799-812.

Zhong et al., "RFID-enabled real-time manufacturing execution system for mass-customization production," Robotics and Computer-Integrated Manufacturing, Apr. 2013, 29(2):283-292.

Zuehlke, "SmartFactory—Towards a factory-of-things," Annual Reviews in Control, 1(34):129-138.

IEEE Standards Association. "IEEE Standard for Local and Metropolitan Area Networks—Part 15.4: Low-Rate Wireless Personal Area Networks (LR-WPANs)." IEEE Standards Association Computer Society, Sep. 5, 2011, 802.15, Apr. 2006, 314, pages.

PCT International Preliminary Report on Patentability in International Appln. No. PCT/EP2019/059873, dated Oct. 27, 2020, 7 pages (with English translation).

* cited by examiner

INDOOR LOCATION SYSTEMS FOR INDUSTRIAL PRODUCTION

CROSS REFERENCE TO RELATED APPLICATIONS

This application is a continuation of and claims priority under 35 U.S.C. § 120 from PCT Application No. PCT/EP2019/059873, filed on Apr. 17, 2019, which claims priority from German Application No. 10 2018 110 145.7, filed on Apr. 26, 2018. The entire contents of each of these priority applications are incorporated herein by reference.

TECHNICAL FIELD

The present disclosure relates to methods and systems for a production control of process sequences in industrial processing of workpieces, in particular in metal and/or sheet metal processing, supported by indoor location systems.

BACKGROUND

As an example for the metal processing industry, many parts of different sizes are often fed to different processing steps in industrial metal and/or sheet metal processing. For example, workpieces, e.g., laser cut parts produced from a preformed base material or punched sheet metal parts, are sorted at a workstation with a machine tool and fed to further processing steps. Cut or punched workpieces are often made available to the respective downstream production step after the machining process as a group. Thereby, mobile transceiver units can be assigned to the workpieces to enable them to be tracked spatially during the various processing steps.

The integration of an indoor location system, which can be used within a production hall, can facilitate the monitoring and control of processing steps. For example, methods to support the sorting process of workpieces produced with a flatbed machine tool, in general methods to support the processing of workpieces, are known from the (as yet unpublished) German patent applications DE 10 2016 120 132.4 ("Werkstücksammelstelleneinheit und Verfahren zur Unterstützung der Bearbeitung von Werkstücken") and DE 10 2016 120 131.6 ("Absortierunterstützungsverfahren und Flachbettwerkzeugmaschine") with filing date Oct. 21, 2016. Furthermore, a support method for sorting, e.g., cut material of a flatbed machine tool is known from the German patent application DE 10 2017 107 357.4 ("Absortierunterstützungsverfahren and Flachbettwerkzeugmaschine") with filing date Apr. 5, 2017. From the German patent application DE 10 2017 120 381.8 ("Assistiertes Zuordnen eines Werkstücks zu einer Mobileinheit eines Innenraum-Ortungssystems") with filing date Sep. 5, 2017, a digital and physical assignment of mobile units, orders and workpieces is also known. Further aspects of the use of an indoor location system are described in the German patent application DE 10 2017 120 378.8 ("Innenraum-Ortung-basierte Steuerung von Fertigungsprozessen in der metallverarbeitenden Industrie") with filing date Sep. 5, 2017. The German patent applications mentioned above are incorporated herein in their entirety.

An example of indoor localization is known from US 2016/0100289 A1, which describes a localization and tracking system for determining the positions of mobile wireless devices using, for example, "Ultra Wide Band" (UWB) technology. The positions of the mobile devices are obtained by calculating arrival time differences, for example. Motion sensors based on UWB technology, which can inter alia be extended with acceleration sensors, are disclosed according to US 2015/0356332 A1, for example, for performance analysis in sports.

SUMMARY

The present disclosure provides methods, devices, and systems for providing flexible indoor localization, e.g., in the environment of metal and/or sheet metal processing, and for configuring an area, within which an indoor location system can determine positions, to be formable in a flexible way to follow production processes.

One aspect of the present disclosure features a method for a production control of process sequences in industrial machining of workpieces supported by an indoor location, the industrial machining performed on a machine tool and according to a processing plan. The method is used, for example, in metal and/or sheet metal processing, for the production of end products and includes the following steps:

providing a plurality of mobile transceiver units, which are configured for transmission and reception, and for example also for processing and creating, of electromagnetic signals for determining their positions in three-dimensional space, and to which, within a framework of process sequences, an object from a group of objects, which can execute movements in three-dimensional space in one or more dimensions autonomously or driven, respectively can be assigned spatially such that the position of a mobile transceiver unit represents location information for the assigned object;

providing an analysis unit that is configured to determine the position of one of said mobile transceiver units in a position determination process from run times of electromagnetic signals received and transmitted by said mobile transceiver units;

identifying one of the mobile transceiver units as a mobile transceiver unit to be localized, the position of which is to be determined in a position determination process for tracking a movement of a target object, which is associated from the group of objects with the mobile transceiver unit to be localized;

identifying at least one of the mobile transceiver units as a mobile transceiver unit whose position is temporarily known, which during the position determination process is locally located at a position (e.g., temporarily stationary) known to the analysis unit;

determining location information of the target object by performing a position determination of the mobile transceiver unit to be localized with the analysis unit using the run times of the electromagnetic signals between the at least one mobile transceiver unit whose position is temporarily known and the mobile transceiver unit to be localized; and integrating the determined location information of the target object into the production control.

A mobile transceiver unit whose position is temporarily known indicates that a position of the mobile transceiver unit is known at least for a time duration needed for determining a position of a mobile transceiver unit to be localized. That is, the position of the mobile transceiver unit is temporarily known for at least that time duration. In some cases, the mobile transceiver whose position is temporarily known can be considered to be stationary during that time duration.

In the disclosures mentioned above and herein, the run times between stationary, e.g., permanently installed transceiver unit(s), whose location is known to the analysis unit, and the mobile transceiver units to be localized are determined to determine inter alia the position of the mobile transceiver unit to be localized. The position determination of a target object can be improved if the run times between one of the mobile transceiver units, which is referred to herein as "mobile transceiver units temporarily known in position," and the transceiver unit to be localized are integrated into the position determination of the mobile transceiver unit to be localized. In some embodiments, several mobile transceiver units can be integrated into the position determination as so-called "mobile transceiver units temporarily known in position." In this way, a very dense network of transceiver units supporting the position determination can be built up. This can improve the positioning of individual target objects. This is especially the case in manufacturing plants of the metal processing industry, where— caused by the high number of electromagnetically poorly or not penetrable as well as highly reflecting objects—a localizing using run time detection of electromagnetic radiation may be unpredictably influenced. Furthermore, the number of stationary transceiver units for position determination can be reduced (or even completely omitted) without worsening the position determination in some embodiments. The terms "mobile transceiver units whose positions are temporarily known" and "mobile transceiver units temporarily known in position" can be used interchangeably herein.

The production control disclosed herein and the production control system disclosed herein includes an indoor location system and an MES (Manufacturing Execution System). The MES can be configured such that processing plans of the workpieces to be produced can be created in it and processed with it. The MES can also be configured to display the status of the workpieces. This means that the MES can be configured to output both the sequence of the processing steps and the processing steps already performed. The MES can also be configured to assign individual processing plans to machine tools. In some embodiments, the MES can also be configured to allow manual or automated intervention in the machining steps of a processing plan at any time. This has the advantage that during the production process several different processing plans can react very flexibly to different, especially unexpectedly occurring events. These events can be, for example, a change in the priority of processing plans or production orders, a new high-priority production order, cancellation of a production order, missing material, e.g., in the case of incorrect delivery, machine failure, lack of qualified personnel, accidents, detection of erroneous quality in a production step, etc.

Herein, generating electromagnetic signals means the conversion of electrical power, e.g., from a DC (direct current) power supply, for example a battery or accumulator, into electromagnetic signals in the radio frequency range or higher frequencies, which are suitable for transmission to further mobile transceiver units (e.g., for communication).

Herein, processing of electromagnetic signals means the analog and/or digital conversion of electromagnetic signals into information that can be stored and/or further processed and can lead to further actions of the mobile transceiver units.

The mobile transceiver units and the stationary transceiver units therefore include electronic circuits and an electrical power supply and can be configured to process data transmitted with the electromagnetic signals.

The production control and the production control system disclosed herein can be configured for the metal processing industry. In the metal processing industry, machine tools, e.g., flatbed machine tools, can be configured to create workpieces as initial elements for subsequent processing procedures (hereafter also referred to as processing step). The workpieces can, for example, be produced by a punching or laser cutting machine according to a processing plan in various shapes and quantities from a flat material, given in particular in a sheet form, e.g., a sheet of metal or a metal object, e.g., a pipe, a sheet metal, or a steel plate. The processing plan can be stored, e.g., digitally, in a production control system, which monitors and controls the processing procedures or processing steps, or in a production control system of a manufacturing plant. For a punching or laser cutting machine, for example, the processing plan can include instructions for controlling where the material is to be cut, e.g., with a punching tool or laser cutting beam. The processing plan can also include further information for subsequent processing steps, such as forming, joining, welding, surface treatment, etc. For the performed and the subsequent industrial processing of the workpieces, all processing plans to be executed can be stored in the production control system or in the production control, e.g., in a digital manner. In a digital processing plan, the corresponding information can be stored according to the order information for the industrial processing of groups of workpieces. The end products mentioned herein have passed through all processing steps according to the assigned processing plan.

In some embodiments, the analysis unit mentioned herein can be an electronic circuit that processes signals, either individually, combined with each other, or both. In some embodiments, the analysis unit can perform analyses according to predetermined or adjustable analog or digital thresholds. In some embodiments, the analysis unit can include a memory, an arithmetic-logic calculation device, and input and output connections and/or devices.

The transceiver unit described herein as "mobile transceiver unit temporarily known in position" is a transceiver unit from the group of mobile transceiver units whose position is known to the analysis unit during the position determination process. In some embodiments, the mobile transceiver unit temporarily known in position can be stationary during the position determination process, i.e., it does not (essentially) move in three-dimensional space. In some embodiments, for example in the metal processing industry, many of the mobile transceiver units are fixed in position, i.e., stationary for a certain period of seconds or minutes or even hours. The analysis unit can be configured to detect one or more of such mobile transceiver units and use them specifically to determine the position of transceiver units to be localized.

The "mobile transceiver unit temporarily known in position" does not necessarily have to be stationary during the positioning process. The run time determination can take a few milliseconds, so that, for example, slow position changes do not cause any malfunction. With the run time determination between a mobile transceiver unit temporarily known in position and the mobile transceiver unit to be localized, the distance between the two transceiver units can be determined. This allows the position determination of the mobile transceiver unit to be localized, even if the mobile transceiver is moving in three-dimensional space, for example, very slowly and predictably. At least the position determination can be further improved by such a usage and inclusion of the signals in the analysis.

Several redundant position determinations can be made and compared to each other to improve the position determination, even if only a few stationary transceiver units are provided.

Another aspect of the present disclosure features an indoor location system that is set up to support the production control of process sequences in the industrial production of workpieces, e.g., in metal and/or sheet metal processing. The indoor location system includes several mobile transceiver units that are configured for the determination of their positions in a three-dimensional space to transmit and receive, and for example also to process and to generate, electromagnetic signals and to which, within a framework of process sequences, respectively an object from a group of objects, which can autonomously or driven execute movements in the three-dimensional space in one or more dimensions, is spatially assigned such that the position of a mobile transceiver unit represents location information for the assigned object. The indoor location system further includes an analysis unit that is configured to determine the position of a mobile transceiver identified as a mobile transceiver to be localized from run times of the electromagnetic signals between mobile transceiver units temporarily known in positions, in particular temporarily stationary mobile transceiver units, in a position determination process in order to perform tracking of a movement of a target object, which is associated from the group of objects to the mobile transceiver unit to be localized.

A further aspect of the present disclosure features a production control system for controlling production processes in a manufacturing plant, e.g., a metal and/or sheet metal processing industrial manufacturing plant. The production control system includes such an indoor location system. The indoor location system is configured as part of the production control system for providing data on the position of at least one mobile transceiver unit in the manufacturing plant. The production control system is configured to include the obtained position of the mobile transceiver unit to be localized, which is assigned to at least one object, in the production control. The production control system can also be set up to perform the methods disclosed herein.

In addition, the indoor location system can include at least one spatially fixedly installed transceiver unit that can contribute to the positioning of the mobile transceiver unit to be localized. Correspondingly, a localizing area in which the analysis unit can perform position determination processes can be spanned by the mobile transceiver units depending on the positions of mobile transceiver units temporarily known in position, in particular temporarily stationary, and the at least one spatially fixedly installed transceiver unit.

At least one of the mobile transceiver units can have a display unit that is configured to display information of an object assigned to one of the mobile transceiver units and/or to display the position of one of the mobile transceiver units, in particular the mobile transceiver unit to be localized, in a site plan of the manufacturing plant.

Position signal modules of the mobile transceiver units can be configured as part of a location system that operates in the range of 1 to 200 GHz transmission and reception frequency. In some embodiments, the positioning system can be based on "Ultra Wide Band (UWB)" technology. At least one of the position signal modules can be configured to receive energy from a power source of the associated transceiver unit for operation and/or to set time delays between received and transmitted signals. A position signal module includes, for example, a signal receiving unit, a signal transmitting unit, and an antenna system for receiving and transmitting signals. The position signal module can also include a signal processing unit that is configured to process received signals and cause signals to be emitted. It can also include the power source of the associated transceiver unit.

In some embodiments, at least one of the mobile transceiver units can include a sensor system. The sensor system can be set up to generate a status signal when a state of the mobile transceiver units is detected where the mobile transceiver unit can contribute to a position determination.

For a position determination process, the positions of the mobile transceiver units, in particular non-moving, temporarily known in position, in particular, temporarily stationary, can be referenced in a manufacturing plant coordinate system, wherein the position of the mobile transceiver unit to be localized is determined in the manufacturing plant coordinate system.

In some embodiments, a localizing area, in which the analysis unit can perform position determination processes for the mobile transceiver unit to be localized, can be spanned depending on the positions of the mobile transceiver units temporarily known in position, e.g., temporarily stationary. At least one permanently installed transceiver unit can contribute to the position determination of the mobile transceiver unit to be localized. A localizing area in which the analysis unit can perform position determination processes for the mobile transceiver unit to be localized can be set up depending on the positions of the mobile transceiver units temporarily known in position, e.g., temporarily stationary, and the at least one spatially fixed transceiver unit. The positions of the mobile transceiver units can be measured by the analysis unit. This is especially done after completion of movements of the mobile transceiver units. Associated position data sets of mobile transceiver units temporarily known in position, e.g., temporarily stationary, can be stored in the analysis unit, whereby the localizing area varies dynamically in its dimensions, and for example also a measuring accuracy of the indoor localization, depending on the positions of the mobile transceiver units temporarily known in position, e.g., temporarily stationary.

A beginning and an end of a movement of the mobile transceiver unit to be localized can be detected with the mobile transceiver units temporarily known in position, e.g., temporarily stationary mobile transceiver units, and/or with a sensor system provided in the respective mobile transceiver unit to be localized.

In some embodiments, a subgroup localizing area can be spanned by a subgroup of mobile transceiver units. The subgroup localizing area can be transferred by transmitting position information of the subgroup of mobile transceiver units to another analysis unit of another location system. Thereby, one can enlarge/spread out a localizing area of the further analysis unit with mobile transceiver units of the further analysis unit.

In some embodiments, the step of integrating the specific location information of the target object into the production control system includes a spatially fixed assignment of the mobile transceiver units respectively to an object of a group of objects. The mobile transceiver unit can be attached to the object in particular or it can be placed in a spatial surrounding area of the object. The group of objects includes, e.g., a workpiece, a means of transport for workpieces, a machine tool, especially a mobile one, a tool, especially a mobile one, or a worker involved in the production. The position of a mobile transceiver unit can thus represent specific location information for the assigned object in the localizing area, especially in a manufacturing plant coordinate system.

The procedure disclosed herein can overcome the strict separation between positionally known, e.g., temporarily stationary (fixed), units and mobile units to be localized. This is made possible by an initial calibration of the positions of mobile transceiver units in a coordinate system of a manufacturing plant, e.g., a production hall, after which they are available for localization as mobile transceiver units temporarily known in position, especially temporarily stationary mobile transceiver units.

Furthermore, the universality of mobile transceiver units eliminates the need for the time-consuming initial installation of stationary (fixed) units and in principle fewer types of devices (only one type, namely the mobile transceiver unit) are needed. Furthermore, a complete coverage of the manufacturing plant can be realized by the number of mobile transceiver units in circulation.

The result is a more robust indoor location system due to the high redundancy of the many mobile transceiver units. Furthermore, the localizing area can be easily extended, because the mobile transceiver units can be used to continue the signal chain, for example, into an office area (e.g., into the control area 30 in FIG. 4) or into an adjacent hall.

Further advantages of aspects disclosed herein concern the simplified, energy-saving integration of an indoor location system based on mobile transceiver units into production processes.

Such indoor location systems allow the detailed mapping of material flows in manufacturing within a production hall into the digital process processing. The location systems simplify the localization of objects/persons in the production environment that are involved in the manufacturing process. Time-consuming searches for workpieces, tools, or persons can be reduced by the indoor location system.

The concepts disclosed herein are based on the use of a 2D/3D indoor location system as a starting point for location-based information processing. The indoor location system transmits to the production control system, which is an MES (Manufacturing Execution System), position data of mobile units to be localized continuously when operating in a localizing mode.

Further advantages of the present disclosure emerge from the description and the drawings. Likewise, the features specified above and the features yet to be listed below can find use both on their own and together in any combinations. The shown and described embodiments should not be considered an exhaustive list but, instead, have an exemplary character for the purposes of explaining the present disclosure.

DETAILED DESCRIPTION

Indoor location systems can be based on different technologies. These systems can include among others: Ultra Wide Band (UWB) tracking systems, Bluetooth Low Energy (BLE) tracking systems, and Wireless Local Area Network (WLAN)-based tracking systems. The technologies differ, inter alia, in their accuracy and speed of position determination as well as in the effort required for installation or integration into a manufacturing plant. Some technologies determine the position of mobile transceiver units in space based on field strength measurement and triangulation. Other technologies use time-of-flight methods to determine the position of mobile units. The methods can differ in accuracy, robustness, and power consumption.

If, however, the mobile transceiver unit to be localized is located in the vicinity of a manual workstation, for example, and is used there to track the movement of a worker, for example, a high scan rate of the position is required to achieve sufficient data density. If the mobile transceiver unit to be localized leaves the manufacturing plants and is loaded, for example, onto a transport device such as a truck or a train, the mobile transceiver unit to be localized loses contact with the UWB location system and activates the Global Positioning System (GPS) location system until the next contact with a UWB location system, e.g., a BLE system, is established.

A transceiver unit of a BLE or UWB system provided in the transport device can register the mere presence of the mobile transceiver unit to be localized and establish the assignment to the transport device. Thereby, the GPS location system of the transport device can be used during transport.

In connection with the figures, the support of the production control of process sequences in the industrial manufacturing of workpieces with mobile transceiver units controlled in terms of energy consumption is explained exemplarily in the following.

Figure 1:
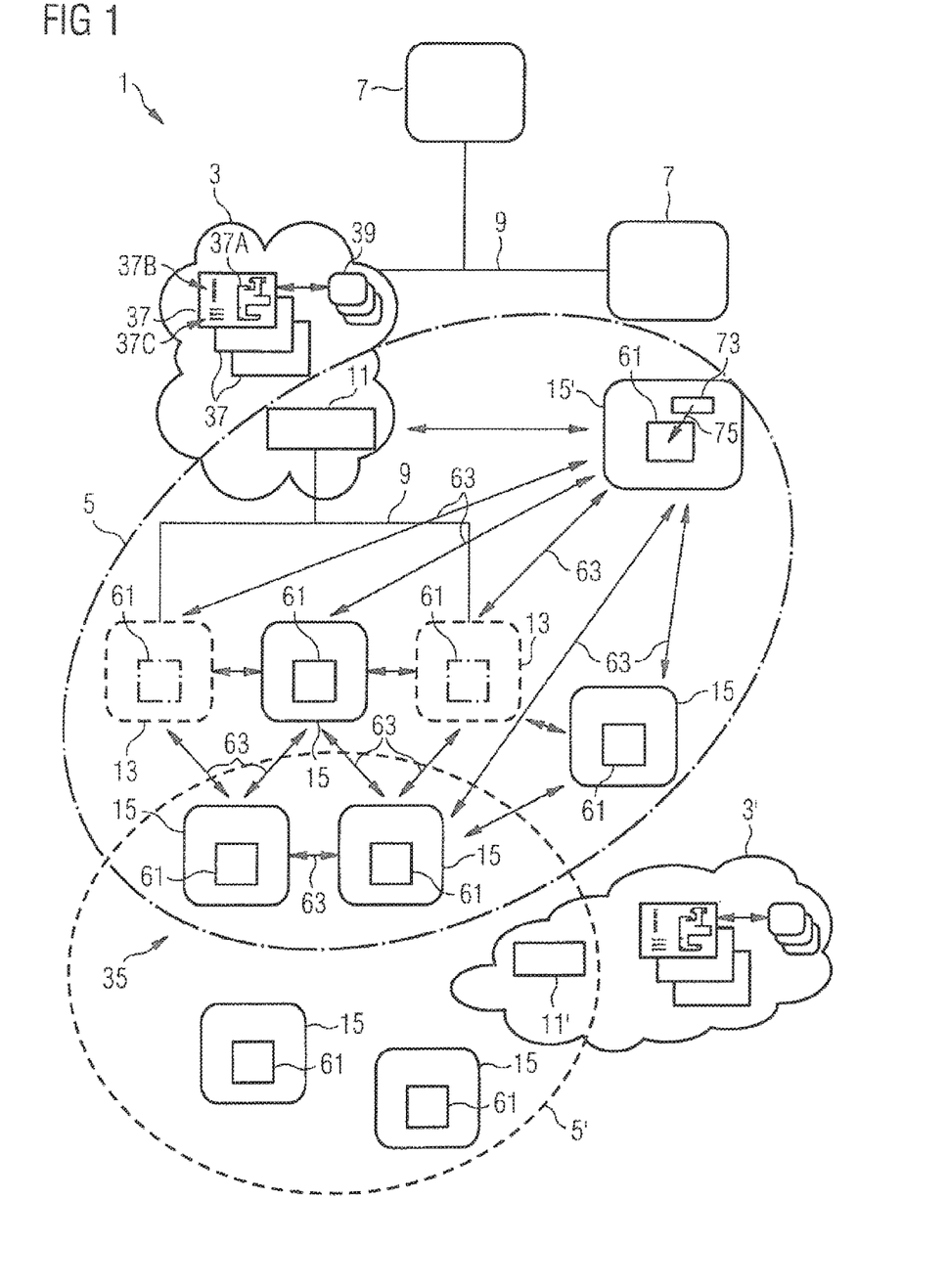
FIG. 1 is an schematic illustration of an example of a production control system with an indoor location system as described herein.

FIG. 1 schematically shows a production control system 1, which includes an MES (Manufacturing Execution System) 3 and an indoor location system 5 (herein in short location system).

In general, the MES 3 is used to control process sequences/production steps in the industrial production of workpieces with machine tools 7. The MES 3 is connected via wireless or wired communication connections 9, for example, to one or more machine tools 7 positioned in a production hall. For this purpose, the MES 3 receives information about the process sequences/production steps as well as status information of the machine tools 7. The MES 3 can be implemented in a data processing device, which can be a single electronic data processing device (server) or a group of several data processing devices (server group/cloud). The data processing device or the network can be provided locally in the manufacturing plant or it can be set up externally in a decentralized manner.

The location system 5 is configured to perform an indoor position determination using mobile transceiver units (also called mobile units of the location system), where one of the mobile transceiver units is to be determined in its position. For example, FIG. 1 shows a mobile transceiver unit 15' to be localized. For this purpose, the location system 5 uses several mobile (e.g., locally mobile, but temporarily with known positions, especially temporarily stationary) transceiver units 15 and optionally additionally stationary (e.g., spatially fixed) transceiver units 13. The location system 5 interacts with the MES 3 regarding the production control. The mobile transceiver unit 15' to be localized is located via the transceiver units 13, 15, e.g., by means of runtime analysis. The mobile transceiver units 15', whose positions are known and which are temporarily not moving, are used as quasi stationary transceiver units. The term "temporarily"

in this context refers to a period of time that is required to perform a position determination process. In addition to the pure measuring time, the period of time can include the time needed for communication and integration of information about the transceiver unit temporarily known in position, especially temporarily stationary. The time can include, e.g., the transmission/acquisition of the position information to the mobile transceiver unit temporarily known in position, especially temporarily stationary, e.g., where it is located, as well as possible time aspects such as how long it has been stationary and how long it will remain stationary.

In contrast to the mobile transceiver units 15, whose positions change again and again depending on the operation of the manufacturing plant, stationary transceiver units 13 can be installed on the hall ceiling, hall walls, machine tools 7, storage structures, etc. at a fixed location in the manufacturing plant. The positions of these stationary transceiver units 13 are stored, for example, in a digital site plan of a production hall (see also FIG. 4).

With the help of the UWB technology mentioned above, the position can be determined with an accuracy of less than 30 cm, for example, even in a production hall that cannot be reached by GPS satellite signals. For a locally increased accuracy, an increased density of transceiver units 13 can be available in individual areas for a more precise localization.

For position determination, the indoor location system 5 also includes an analysis unit (or analyzer) 11. The analysis unit 11 is configured, for example, to determine run times of electromagnetic signals between the transceiver units 13, 15 and the mobile transceiver unit 15' to be localized. From the run times, the analysis unit 11 derives the position of the mobile transceiver unit 15' to be localized in the production hall and provides the data on the position of the mobile transceiver unit 15' (position data) to the MES 3. For example, the analysis unit 11 can be configured as a part of the MES 3, in which the measured positions are compared with data sets also available in the MES 3. The indoor location system 5 is characterized by the fact that the position of the mobile transceiver units can be determined by the analysis unit 11 alone, thus without manual interaction.

For example, the mobile transceiver units 15 (and optionally the stationary transceiver units 13) can be set up to send UWB radio signals to the mobile transceiver units to be localized and to receive UWB radio signals from the mobile transceiver units. If the distances from a mobile transceiver unit to be localized to several transceiver units 15 whose location is known at the time of measurement are determined, the spatial location of the mobile transceiver unit to be localized can be determined in relation to the transceiver units 15, e.g., by triangulation. The distance between a mobile transceiver unit 15' to be localized and a transceiver unit 15 temporarily known in position, in particular temporarily stationary, can be determined by the time required for the signal to overcome the distance between the two units.

To determine the run time, the transceiver units 13, 15 can be equipped with high-precision clocks that can determine the time to a few or even only fractions of nanosecond (ns). Even if the clocks in the transceiver units 13, 15 are highly accurate, the clocks are not necessarily synchronized. Different methods of synchronizing clocks or eliminating errors following from the asynchronous clock course can be used. For example, one of the transceiver units 13, 15, e.g., acting as master position determination unit, can send a first signal at a first time T1 and a second signal at a second time T2. The mobile transceiver units 15 can either know the time difference T2-T1 or transmit it together with the signals so that they can synchronize with the time of the other transceiver units 13, 15. Alternatively, the master position determination unit can transmit two signals at a previously known time difference Ta. In this case, the transceiver unit 13, 15 (or the analysis unit 11) can use its own time measurement with its own clock from reception of the first signal to reception of the second signal to determine the synchronization deviation and calculate it from the distance measurement. The time interval (or temporal distance) between the first signal and the second signal can be short so that the mobile transceiver unit 15' to be localized has not moved significantly during this time. The time interval can be selected by the mobile transceiver unit in such a way that the time interval is a predetermined multiple or a predetermined fraction of the time required by the mobile transceiver unit from the reception of a signal to which the mobile transceiver unit is to respond until the output of the first signal.

Fixed transceiver units 13 can also be connected to the analysis unit 11 via wireless or wired communication links. For example, mobile transceiver units can communicate (only) via stationary transceiver units 13. Alternatively or additionally, they can communicate independently with the analysis unit 11/the MES 3 via further communication connections 9 (e.g., a WLAN connection or a BLE connection).

The analysis unit 11 can, for example, serve as a central master position determination unit (also called a "server"). For example, the central master position determination unit defines a communication frame for UWB communication. The communication frame contains, among other things, the transmission time of the frame(s) of UWB radio signals. In an exemplary implementation of indoor localizing, one of the transceiver units 13, 15 transmits as master position determination unit for a position determination process of a mobile transceiver unit 15' to be localized the communication frame to the transceiver units 13, 15. The communication frame is used for the signal exchange of the position determination process between, e.g., only the mobile transceiver units 15. The position of the stationary transceiver units 13 with respect to the master position determination unit is known to the transceiver units, e.g., by querying a central database, so that the transceiver units as well as the analysis unit 11 know the time offset between transmission and reception of the UWB radio signal by the signal run time.

After a predetermined time interval, e.g., 100 ms, from transmitting a first communication frame, the master position determination unit transmits a second communication frame, which is received by the transceiver units. By detecting the time from the beginning of the reception of the first frame to the beginning of the reception of the second frame, the transceiver units know exactly what the master position determination unit understands by, for example, 100 ms. This allows the transceiver units to synchronize the frequency of their timing units with the master position determination unit.

After different, previously configured time intervals (measured from the reception of the second frame) mobile transceiver units 15 send a response frame. For example, a "tag 1" sends after 10 ms, a "tag 2" after 20 ms, a "tag 3" after 30 ms, etc. This radio transmission is received by the transceiver units and the exact time of reception with respect to the start of transmission of the second frame of the master position determination unit is transmitted to the analysis unit 11. The analysis unit 11 then determines the position data of the positions of the mobile transceiver units 15' to be localized, e.g., by trilateration methods, and passes the position data on to the MES 3.

Using the exemplary analysis of run times and trilateration described above, the indoor location system 5 can detect the position of one or more mobile transceiver units 15' to be localized via transceiver units 13, 15 using UWB technology. The UWB technology uses frequency ranges from, e.g., 3 GHz to 5 GHz, whereas the UWB technology uses a relatively large frequency range for the formation of temporally sharply defined signal characteristics (communication frames). To locate an object that emits radio waves as precisely as possible, a signal with very steep edges is required. This means that the signal represents a rectangular signal shape over time rather than a sinusoidal signal shape. For this, a signal is needed, where several sinusoidal signals with different frequencies are superimposed. This is because a signal can be formed from several sinusoidal signals with different frequencies, which has a steep edge and can be approximated to an essentially rectangular shape over time. This means that several frequencies from a broadband frequency spectrum must be available to form a signal. Accordingly, UWB technology, which has a broadband frequency spectrum, can be suitable for exact localization. The technology and the usable frequency bands of the UWB technology are described, for example, in the standard "IEEE 802.15-2015".

Figure 2:
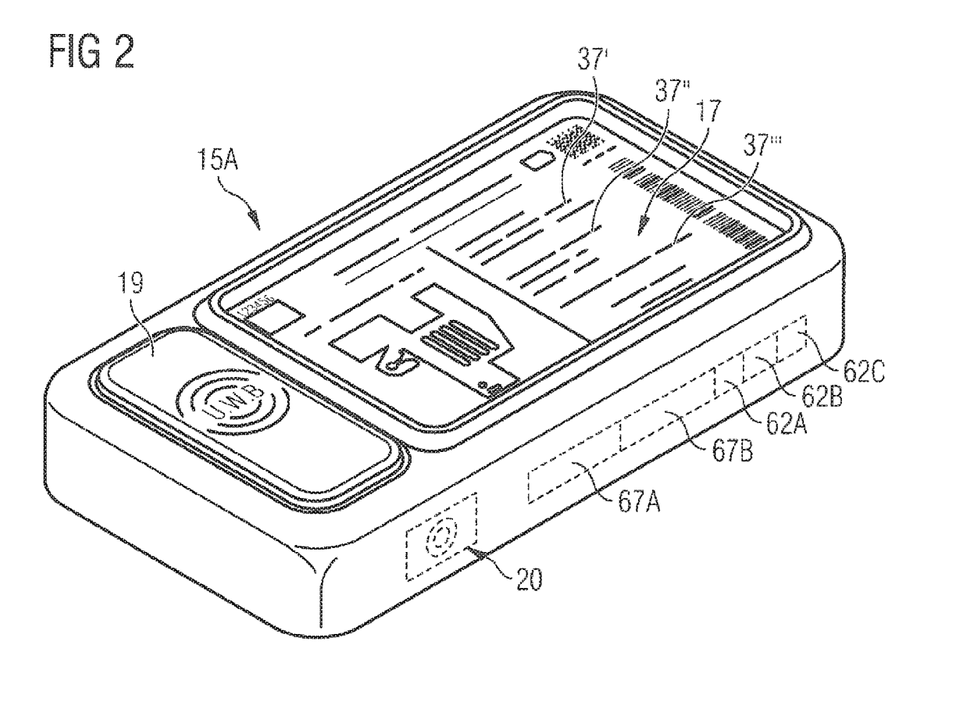
FIG. 2 shows an illustration of an example of a mobile transceiver unit to be localized.
Figure 3:
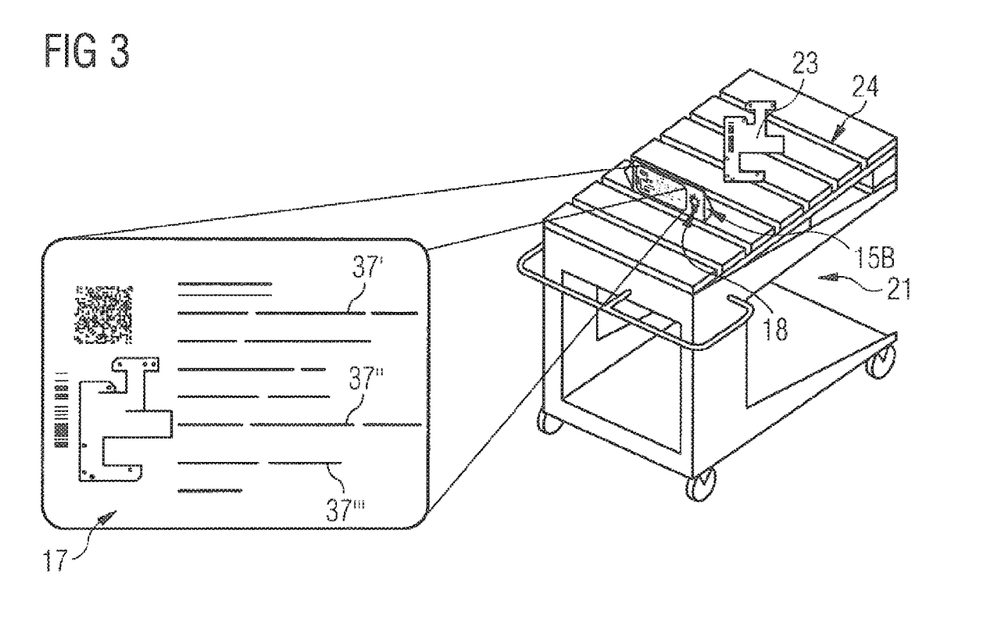
FIG. 3 shows an illustration of another example of a mobile transceiver unit to be localized on a transport trolley for workpieces.

FIGS. 2 and 3 show exemplary mobile transceiver units 15A, 15B, which on the one hand can be localized and on the other hand can be used in a position determination process as mobile transceiver units 15A, 15B temporarily known in position, e.g., temporarily stationary. The mobile transceiver units 15A, 15B can be used as independent units in the production process. In some embodiments, mobile transceiver units can be carried by persons in production or attached to auxiliary equipment such as transport trolleys, machines, and tools to support and/or record processes. For example, the mobile transceiver unit 15A, 15B can be spatially assigned to one or more workpieces 23, placed on a storage area 24 of a transport trolley 21 (see FIG. 3) and then taken along by a worker together with the assigned workpieces 23 from machining step to machining step/from machine tool 7 to machine tool 7.

For worker interaction with the mobile transceiver units 15A, 15B, the mobile transceiver units 15A, 15B have, for example, an electronically controllable display 17, for example, an E-Ink display (also known as electronic paper display). The display 17 is used to output, e.g., information on the order, readable for man and/or machine, coded and/or in writing and/or as a figure. For example, the mobile transceiver unit 15B receives information about the number of deposited workpieces 23, workpieces still missing, a subsequent processing step, an underlying order (customer), target material, etc. and outputs the information on the display 17. The display 17 can also be used as a signal emitting device for a feedback to the user. Further examples of signal emitting devices are light emitted diodes (LEDs) and loudspeakers.

In some embodiments, the electronics of the mobile transceiver units 15A, 15B are operated with a battery or rechargeable battery.

During production, the mobile transceiver unit 15A, 15B are mobile transceiver units to be localized or to contribute to the localizing, if the position of the mobile transceiver unit 15A, 15B is to be detected and processed or does not change temporarily. Furthermore, the mobile transceiver unit 15A, 15B can contribute to a position determination process as quasi stationary transceiver units if they are temporarily not moved.

A mobile transceiver unit can have a signal output device 18 in its general form. The signal output device 18 can be a light-emitting device, e.g., an LED, a sound-emitting device, e.g., a signal generator, piezo buzzer, loudspeaker, ultrasonic transmitter, a transmitter for electric, magnetic or electromagnetic signals, etc.

A mobile transceiver unit can also, in its general form, include a device for performing tactile movements such as vibrating, tapping, twitching.

A mobile transceiver unit can also, in its general form, include a device for detecting movements, such as shaking, bumping, tapping, gesture recognition, e.g., an accelerometer, MEMS, or gyrometer.

In addition, a signal input device 19 can be integrated in mobile transceiver units for the input of parameters. For example, a user can press a key on the mobile transceiver unit 15 or image a code with a camera 20 on the mobile transceiver unit. The signal input device 19 can be a sensor, e.g., a light sensor, an infrared (IR) sensor, a temperature sensor, a pressure sensor (such as e.g., push buttons or switches), noise sensor (such as microphone or ultrasonic sensor), or a sensor for other electrical, magnetic, or electromagnetic signals, etc.

As is exemplarily described in the present disclosure listed at the beginning, the provision of mobile transceiver units can be used in many ways in production.

For example, FIG. 1 also schematically illustrates that in the production control system 1 processing plans 37 are stored digitally, in each of which order information for the industrial machining of processing plan-specific workpieces is stored. In some embodiments, a processing plan 37 includes order information that is available, for example, in the form of geometry data sets 37A of the workpieces on which the order is based and/or a coding data set 37B identifying the order. In addition, the processing plan 37 can include one or more processing and workpiece parameters of the workpieces as well as a digital processing schedule 37C of the order. These data can also be displayed individually, in combination, or all together on the display 17 of the mobile transceiver unit. In addition, further information 37', 37'', 37''' (see FIG. 2)—e.g., about status, material, order, customers, number of parts, production process steps, e.g., the current production process step and/or the next production process step, error message, etc.—can be displayed.

In addition, FIG. 1 shows position data sets 39 that were acquired with an indoor location system for the mobile transceiver units 15.

FIG. 1 also shows schematically how the indoor location system 5 can be operated with mobile transceiver units 15. As explained, e.g., in connection with FIG. 3, an object (such as a transport trolley or a subgroup of objects such as workpieces of an order) can be spatially assigned to a mobile transceiver unit 15 within the frame of process sequences so that the position of the mobile transceiver unit 15 represents location information for the assigned object. A mobile transceiver unit 15 thus makes it possible to track the assigned object (the subgroup of objects) when it moves autonomously or driven in three-dimensional space (in one or more dimensions).

In some embodiments, the objects can originate from a group of movable objects, such as those given in the framework of industrial production of workpieces in manufacturing plants. The group of objects thus includes, for example, workpieces, transport devices for workpieces, mobile machine tools, a mobile tool, and workers involved in the production process.

Position signal modules of the mobile transceiver units 15 are used for indoor positioning. A position signal module is operated in a localizing mode for receiving, processing, generating, and transmitting electromagnetic signals 63 if the associated mobile transceiver unit 15 is to contribute to the determination of the position of at least one of the mobile transceiver units 15 in three-dimensional space within the frame of indoor localizing. The mobile transceiver unit, whose position is to be determined, is also referred to herein as the mobile transceiver unit to be localized.

The analysis unit 11 of the location system is configured to determine the position of a mobile transceiver unit 15' to be localized in a position determination process from run times of the electromagnetic signals 63 between the mobile transceiver unit to be localized and other transceiver units. The other transceiver units can include one or more mobile transceiver units 15, which are at least temporarily not moving in space for the positioning process. In addition, the other transceiver units can include stationary transceiver units 13, which are permanently installed in the production hall. The position determination process serves, for example, to follow a target object from the group of objects to which the mobile transceiver unit to be localized is assigned in its movement in the production hall.

In some embodiments, a position signal module 61 is configured as part of a location system based on "Ultra Wide Band (UWB)" technology.

The position signal module 61 is connected to an energy source 67A of the corresponding transmitter-receiver unit 15, from which it receives energy for the operation of the localizing mode (e.g., a UWB localizing mode). In some embodiments, the position signal module 61 itself can include the energy source, for example a rechargeable battery.

Furthermore, a position signal module 61 can have a signal receiving unit 62A, a signal transmitting unit 62B and an antenna system 62C for receiving and radiating signals, e.g., UWB signals.

Furthermore, a position signal module 61 can include a signal processing unit 67B, which is configured to process received signals (e.g., UWB signals) and to cause the emission of signals (e.g., UWB signals) as well as to set time delays between received and transmitted signals 63 (e.g., UWB signals).

As furthermore shown in FIG. 1, one of the mobile transceiver units 15 can have a sensor module 73. The sensor module 73 is configured to generate a status signal when a status of the mobile transceiver units 15 is detected in which the mobile transceiver unit 15 can contribute to a position determination.

For example, the sensor module 73 can transmit a status signal 75 to the position signal module 61 so that the signal module 61 then actively reports to the analysis unit 11 that it can be used as a quasi-stationary unit for position determination. The sensor module 73 can have one or more sensors, such as an acceleration sensor, a position sensor, or a magnetic sensor. The sensor module 73 can, for example, be configured to detect a spatially stationary idle state of the mobile transceiver unit 15, where during detecting the spatially stationary idle state the sensor module 73 continuously outputs the status signal 75.

Figure 4:
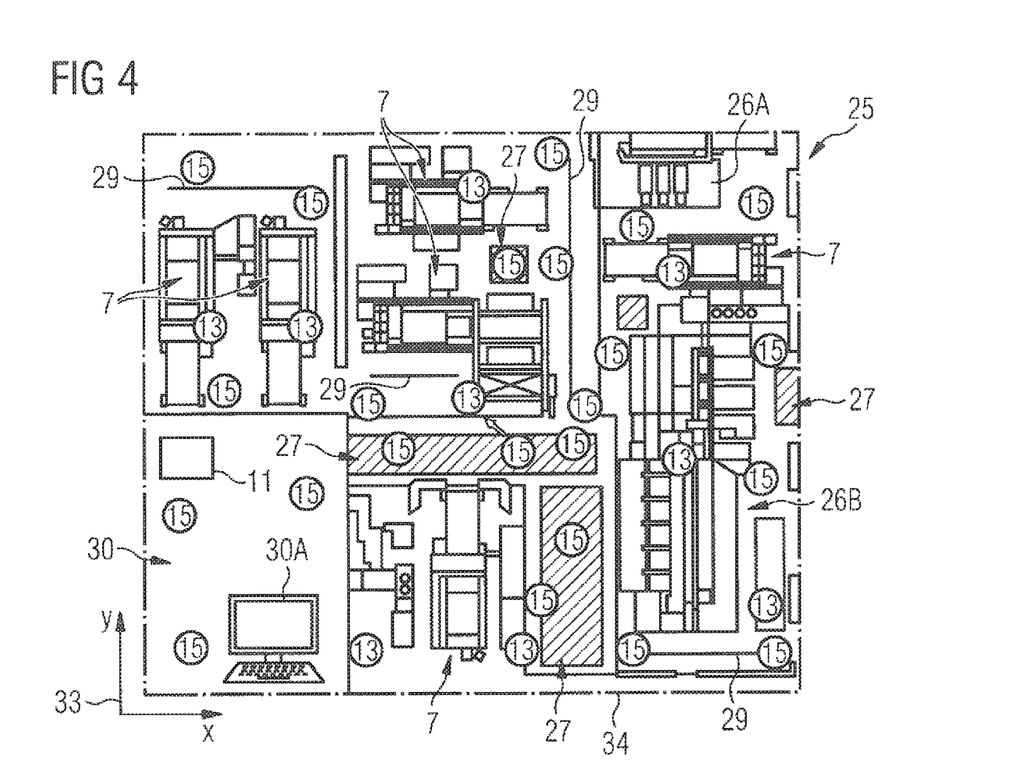
FIG. 4 a digital site plan of an example of a production hall as described herein.

FIG. 4 shows a top view of a digital site plan 25 of an exemplary production hall with several workstations and machine tools 7. It can be seen how a large number of mobile transceiver units 15 (optionally in interaction with permanently installed transceiver units 13) distributed over the entire production hall spans a localizing area 34 over the entire production hall (including, e.g., offices).

Examples of machine tools 7 in metal and metal processing are cutting, e.g., laser cutting machines, punching, grinding, bending machines etc. FIG. 4 shows several stationary mounted transceiver units 13 and several momentary positions of mobile transceiver units 15.

The site plan 25 shows as an example a workstation 26A networked to a very low degree, such as a manual workstation with simple machines, e.g., for drilling, sawing, milling, bending, which has no networking or only networking via a monitoring system. Furthermore, FIG. 4 shows a storage area 26B, in which workpieces, transport devices, and mobile transceiver units 15 assigned to them can be stored temporarily for a period of time.

The site plan 25 also shows 25 (virtual—digitally set up) zones 27 and (virtual—digitally set up) barriers 29. Zones 27 and barriers 29 have been defined by an operator with regard to the use of machine tools 7 and associated work processes. The barriers 29 extend spatially (e.g., linearly) in the production hall and define limits, the crossing of which can trigger specific actions by a mobile transceiver unit. Workpiece-specific or object/operator-specific properties can be generally assigned to the zones 27 and the barriers 29.

With the indoor location system, the positions of the mobile transceiver units 15 can be determined and displayed in the site plan 25, provided that the production hall on which the site plan 25 is based is included in the localizing area of the indoor location system.

In a control area 30 included in the site plan 25, the location of a production control device of the production control system 1 is indicated. The control area 30 can contain the analysis unit 11 as well as components/control protocols of an energy demand recognition module. The control area 30, as an example of office space, can also contain a data processing device 30A (e.g., a personal computer) with a screen (e.g., monitor) on which, for example, the digital site plan 25 shown in FIG. 4 is displayed.

Figure 5:
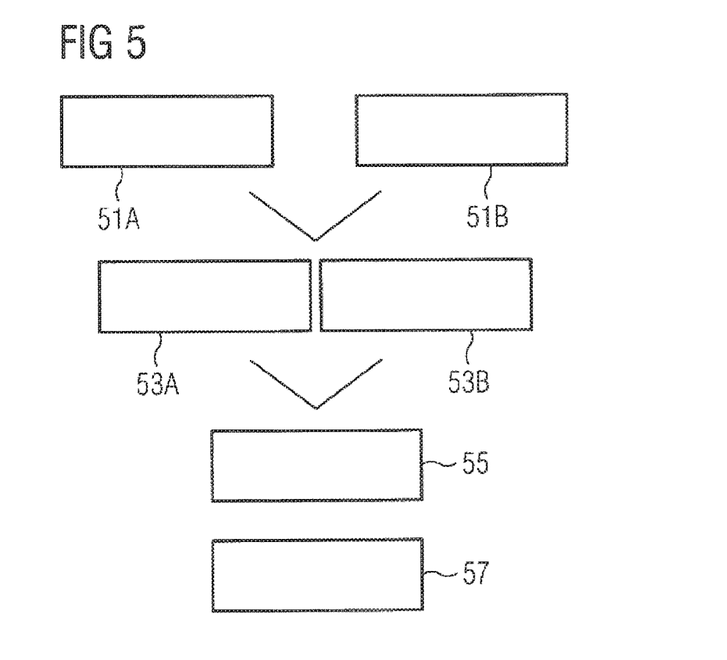
FIG. 5 is a flow chart for illustrating a production supported by an indoor location system as described herein.

FIG. 5 shows in a flowchart exemplary process steps to illustrate a production supported by an indoor location system.

For the procedure, an indoor localizing as described above is provided. For example, in step 51A several mobile transceiver units 15 are provided, which are configured to transmit and receive electromagnetic signals to determine their positions in a three-dimensional space. The mobile transceiver units 15 are spatially assigned to one object out of a group of objects in each case. The objects can move autonomously or driven in the three-dimensional space in one or more dimensions. The assignment has the effect that the position of a mobile transceiver unit 15 represents location information for the assigned object.

In step 51B, an analysis unit 11 is provided, which is designed to determine the position of one of the mobile transceiver units 15 in a position determination process from run times of the electromagnetic signals between the mobile transceiver units 15.

In step 53A, one of the mobile transceiver units 15 is determined as mobile transceiver unit 15' to be localized. This means that the position of the mobile transceiver unit 15' to be localized is determined in a position determination process, which can be used to track the movement of a target object. The target object here is the object that has been assigned from the group of objects to the mobile transceiver unit 15' to be localized.

In a step 53B, several of the mobile transceiver units 15 are identified as temporarily known in position, e.g., temporarily stationary mobile transceiver units 15. During the position determination process, these are locally stationary at positions that are known to the analysis unit 11.

In step 55, the location information of the target object is determined by performing a position determination of the mobile transceiver unit 15' to be localized, using the analysis unit 11 and using the run times of the electromagnetic signals between the mobile transceiver units 15 temporarily known in their positions, e.g., temporarily stationary, and the mobile transceiver unit 15' to be localized.

In step 57, the determined location information of the target object is integrated into the production control.

In the localizing methods described herein, a mobile transceiver unit combines two functions in one device. On the one hand, the position of each mobile transceiver unit can be determined with the help of the other mobile transceiver units. On the other hand, each mobile transceiver unit itself can serve as an anchor point for determining the position of other mobile transceivers. This results in two application scenarios for a mobile transceiver unit. A mobile transceiver unit is used in a movable way (e.g., fixed on a transport device) to locate it. Subsequently, it is regularly re-measured, e.g., when or after movement, and thus referenced in the coordinate system of the location system. An exemplary coordinate system 33 is shown in FIG. 4 in relation to the site plan 25. Thereby, it can be used again as "anchor point" (mobile transceiver unit temporarily known in position, e.g., temporarily stationary) for measuring further mobile transceiver units.

By this dynamic change of anchor points, the localizing area, in which a good illumination by mobile transceiver units is given, can be defined dynamically. The localizing area can thus be adapted to the specific requirements in a current production environment. In some embodiments, this type of signal concatenation can be used to illuminate areas that are difficult to access or shaded, thus ensuring comprehensive coverage of the manufacturing plant.

The local sensor technology of the mobile transceiver units in combination with relative measurements between mobile transceiver units allows a robust derivation, which mobile transceiver units are currently stationary and which are currently in motion. Stationary devices are used for referencing (position determination) to the coordinate system of the manufacturing plant, while mobile devices are referenced in this coordinate system, i.e., are determined in their positions in the manufacturing plant. In this sense, the localizing disclosed herein includes a continuous measurement of positions to calibrate the localizing function.

This allows a simple extension of the localizing area. Mobile transceiver units referenced at the original coordinate system of the manufacturing plant are sufficient as a basis to set up a referenced coordinate system in a new workspace and to build up dynamic location systems in this workspace.

This new workspace can also be a transport device such as a truck or a railroad wagon. The measurement chain can be maintained through entire supply chains by subsequent concatenation with, for example, GPS measurements. Correspondingly, localizing areas can also pass from one location system to another location system.

This is indicated in FIG. 1 with a further MES 3', which includes its own location system 5'. This is illustrated by a further analysis unit 11', which interacts with its own mobile transceiver units 15.

Subgroups 35 of mobile transceiver units of the location system 5 can be transferred to the location system 5'. Correspondingly, assigned objects, their position information and other information are transferred to the further MES 3'. The mobile transceiver units can be integrated into the further production control.

For example, five shipments of goods are each equipped with a mobile transceiver unit and loaded onto a truck. Through contact with a local location system of the truck, the mobile transceiver units enlarge the localizing area around the new local coordinate system referenced to the truck. Thus, the relative positions of the goods in the truck are clearly defined. Due to the redundancy of the five mobile transceiver units, movements of individual goods in the loading area can be detected when the goods are put into storage.

If the truck now transfers the goods to another manufacturing plant, a local coordinate system is set up in the truck during the movement by the mobile transceiver units and, for example, is tracked relative to the initial hall system with the aid of GPS tracking. On arrival, all goods in the truck are still clearly referenced to each other and even to the initial hall system.

Now the mobile transceiver units can be transferred together with the goods to a manufacturing plant that continues processing. The mobile transceiver units are then transferred to the further tracking system 5' and the MES 3'. There, the mobile transceiver units dynamically supplement the already existing localizing area of the further location system 5'.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed disclosure, in particular as limits of value ranges.

What is claimed is:

1. A method for production control, supported by an indoor localization, of process sequences in industrial processing of workpieces for manufacturing end products, the method comprising:
    identifying one of a plurality of mobile transceivers of an indoor location system as a mobile transceiver to be located during a position determination process,
    wherein at least one of the plurality of mobile transceivers is configured to determine a position of a selected mobile transceiver of the plurality of mobile transceivers in a three-dimensional space,
    wherein each of the plurality of mobile transceivers is spatially assignable to a corresponding object from a group of objects within a framework of process sequences,
    wherein each of the group of objects is movable in one or more dimensions in the three-dimensional space, and
    wherein the mobile transceiver to be located is assigned to a target object of the group of objects;

identifying at least one mobile transceiver of the plurality of mobile transceivers as at least one mobile transceiver whose position is temporarily known, which during the position determination process is locally located at a position known to an analyzer of the indoor location system;

determining, by the analyzer, location information of the target object by performing a position determination of the mobile transceiver to be localized based on run times of electromagnetic signals between the at least one mobile transceiver whose position is temporarily known and the mobile transceiver to be localized; and integrating the determined location information of the target object into the production control, wherein the mobile transceiver to be localized is spatially fixedly assigned to the target object by attaching the mobile transceiver to be localized to the target object or depositing the mobile transceiver to be localized in a spatial surrounding area of the target object, and wherein a position of the mobile transceiver to be localized represents specific location information for the target object in a localizing area.

2. The method of claim 1, wherein performing the position determination of the mobile transceiver to be localized comprises:

determining a position of the mobile transceiver to be localized in a localizing area that is spanned by mobile transceivers whose positions are temporarily known.

3. The method of claim 2, wherein performing the position determination of the mobile transceiver to be localized comprises:

determining the position of the mobile transceiver to be localized in the localizing area that is spanned in dependence on the positions of the mobile transceivers whose positions are temporarily known and a position of at least one spatially fixedly installed transceiver.

4. The method of claim 2, wherein the analyzer is configured to:

measure positions of the plurality of mobile transceivers; and store associated position data sets of the mobile transceivers whose positions are temporarily known.

5. The method of claim 2, wherein the localizing area comprises:

a subgroup localizing area that is spanned by a subgroup of the plurality of mobile transceivers.

6. The method of claim 5, further comprising:

transferring information of the subgroup localizing area to a further analyzer of a further location system by transmitting position information of the subgroup of the plurality of mobile transceivers to establish a localizing area of the further analyzer with mobile transceivers of the further location system.

7. The method of claim 1, wherein performing the position determination of the mobile transceiver to be localized comprises:

detecting a beginning and an end of a movement of the mobile transceiver to be localized with the at least one mobile transceiver whose position is temporarily known and with a sensor system provided in the mobile transceiver to be localized.

8. The method of claim 1, wherein performing the position determination of the mobile transceiver to be localized comprises:

referencing the position of the at least one mobile transceiver whose position is temporarily known in a manufacturing plant coordinate system; and determining a position of the mobile transceiver to be localized in the manufacturing plant coordinate system.

9. The method of claim 1, wherein the group of objects comprises at least one of:

a workpiece,
a workpiece transport device,
a machine tool,
a manufacturing tool, or
a worker involved in the industrial processing.

10. An indoor location system for supporting production control of process sequences in an industrial production of workpieces, the indoor location system comprising:

a plurality of mobile transceivers, at least one of the plurality of mobile transceivers being configured to determine a position of a selected mobile transceiver of the plurality of mobile transceivers in a three-dimensional space, each of the plurality of mobile transceivers being spatially assignable to a corresponding object from a group of objects within a framework of process sequences, each of the group of objects being movable in one or more dimensions in the three-dimensional space;

an analyzer configured to determine the position of the selected mobile transceiver based at least on run times of electromagnetic signals between the plurality of mobile transceivers in a position determination process and to perform tracking of a movement of a target object assigned to the selected mobile transceiver based on the determined position of the selected mobile transceiver; and at least one spatially fixedly installed transceiver, wherein the analyzer is configured to perform position determinations in position determination processes in a localizing area spanned in dependence on a position of the at least one spatially fixedly installed transceiver and positions of mobile transceivers whose positions are temporarily known during the position determination processes.

11. The indoor location system of claim 10, wherein at least one of the plurality of mobile transceivers has a display configured to display at least one of:

information of a corresponding object assigned to a first one of the plurality of mobile transceivers, or a position of a second one of the plurality of mobile transceivers in the three-dimensional space that corresponds to a site plan of a manufacturing plant coordinate system.

12. The indoor location system of claim 10, wherein each of the plurality of mobile transceivers comprises a respective position signal module, and wherein the position signal modules of the plurality of mobile transceivers are configured as part of a location system configured to operate in a range of 1 to 200 GHz transmission and reception frequency.

13. The indoor location system of claim 12, wherein the location system is based on Ultra Wide Band (UWB) technology.

14. The indoor location system of claim 12, wherein at least one of the position signal modules is configured to perform at least one of:

receiving energy from a power source of an associated mobile transceiver for operation, or setting time delays between received signals and transmitted signals, and wherein the at least one of the position signal modules comprises at least one of:

a signal receiver, a signal transmitter, and an antenna system for receiving and transmitting signals, a signal processor configured to process the received signals and cause signals to be emitted, or the power source of the associated mobile transceiver.

15. The indoor location system of claim 12, wherein at least one mobile transceiver of the plurality of mobile transceivers comprises a sensor system, and wherein the sensor system is configured to generate a state signal when a state of the at least one mobile transceiver is detected, in which the at least mobile transceiver is configured for position determination.

16. The indoor location system of claim 15, wherein the sensor system comprises at least one of an acceleration sensor, an orientation sensor, or a barometer sensor.

17. The indoor location system of claim 10, wherein the mobile transceiver to be localized is spatially fixedly assigned to the target object by attaching the mobile transceiver to be localized to the target object or depositing the mobile transceiver to be localized in a spatial surrounding area of the target object, and wherein a position of the mobile transceiver to be localized represents specific location information for the target object in a localizing area.

18. A production control system for controlling production processes in a manufacturing plant, the production control system comprising:

an indoor location system comprising:
a plurality of mobile transceivers, at least one of the plurality of mobile transceivers being configured to determine a position of a selected mobile transceiver of the plurality of mobile transceivers in a three-dimensional space, each of the plurality of mobile transceivers being spatially assignable to a corresponding object from a group of objects within a framework of process sequences, each of the group of objects being movable in one or more dimensions in the three-dimensional space; and an analyzer configured to determine the position of the selected mobile transceiver based at least on run times of electromagnetic signals between the plurality of mobile transceivers in a position determination process and to perform tracking of a movement of a target object assigned to the selected mobile transceiver based on the determined position of the selected mobile transceiver, wherein the indoor location system is configured to provide data on a position of at least one mobile transceiver of the plurality of mobile transceivers in the manufacturing plant; and a manufacturing execution system configured to include the data on the position of the at least one mobile transceiver to a corresponding object assigned to the at least one mobile transceiver in a production control, wherein the indoor location system further comprises at least one spatially fixedly installed transceiver, and wherein the analyzer is configured to perform position determinations in position determination processes in a localizing area spanned by the plurality of mobile transceivers in dependence on a position of the at least one spatially fixedly installed transceiver and positions of mobile transceivers whose positions are temporarily known to the analyzer during the position determination processes in the plurality of mobile transceivers.

19. The production control system of claim 18, wherein the mobile transceiver to be localized is spatially fixedly assigned to the target object by attaching the mobile transceiver to be localized to the target object or depositing the mobile transceiver to be localized in a spatial surrounding area of the target object, and wherein a position of the mobile transceiver to be localized represents specific location information for the target object in a localizing area.

20. A method for production control, supported by an indoor localization, of process sequences in industrial processing of workpieces for manufacturing end products, the method comprising:

identifying one of a plurality of mobile transceivers of an indoor location system as a mobile transceiver to be located during a position determination process,
wherein at least one of the plurality of mobile transceivers is configured to determine a position of a selected mobile transceiver of the plurality of mobile transceivers in a three-dimensional space,
wherein each of the plurality of mobile transceivers is spatially assignable to a corresponding object from a group of objects within a framework of process sequences,
wherein each of the group of objects is movable in one or more dimensions in the three-dimensional space, and
wherein the mobile transceiver to be located is assigned to a target object of the group of objects;

identifying at least one mobile transceiver of the plurality of mobile transceivers as at least one mobile transceiver whose position is temporarily known, which during the position determination process is locally located at a position known to an analyzer of the indoor location system;

determining, by the analyzer, location information of the target object by performing a position determination of the mobile transceiver to be localized based on run times of electromagnetic signals between the at least one mobile transceiver whose position is temporarily known and the mobile transceiver to be localized, wherein performing the position determination of the mobile transceiver to be localized comprises: determining a position of the mobile transceiver to be localized in a localizing area that is spanned by mobile transceivers whose positions are temporarily known, and wherein the localizing area comprises a subgroup localizing area that is spanned by a subgroup of the plurality of mobile transceivers;

integrating the determined location information of the target object into the production control; and transferring information of the subgroup localizing area to a further analyzer of a further location system by transmitting position information of the subgroup of the plurality of mobile transceivers to establish a localizing area of the further analyzer with mobile transceivers of the further location system.

* * * * *